United States Patent
Schmid

(10) Patent No.: US 6,921,039 B2
(45) Date of Patent: Jul. 26, 2005

(54) BELT SPOOL FOR A BELT RETRACTOR

(75) Inventor: Johannes Schmid, Gmünd (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/641,855

(22) Filed: Aug. 14, 2003

(65) Prior Publication Data

US 2004/0031872 A1 Feb. 19, 2004

(30) Foreign Application Priority Data

Aug. 16, 2002 (DE) .................. 202 12 591 U

(51) Int. Cl.$^7$ ................................ B65H 75/48
(52) U.S. Cl. .................... 242/379.1; 280/805
(58) Field of Search ............. 242/379.1; 280/805; 297/472

(56) References Cited

FOREIGN PATENT DOCUMENTS

| DE | 20006619 | 9/2000 |
|---|---|---|
| DE | 201113834 | 3/2002 |

*Primary Examiner*—John Q. Nguyen
(74) *Attorney, Agent, or Firm*—Tarolli, Sundheim, Covell & Tummino L.L.P.

(57) ABSTRACT

A belt spool (10) for a belt retractor comprises a spool body (14) which has at least one flange (18), a locking disc (12) which is arranged at an axial end of the spool body, and a torsion rod (2) having two ends. One of the ends is non-rotatably fastened to said spool body (14), and the other end is non-rotatably fastened to the locking disc (12). A holding ring (22) is provided which encompasses the flange (18) and an outer rim of the locking disc (12), thereby securing the locking disc (12) in axial direction on the spool body (14).

4 Claims, 5 Drawing Sheets

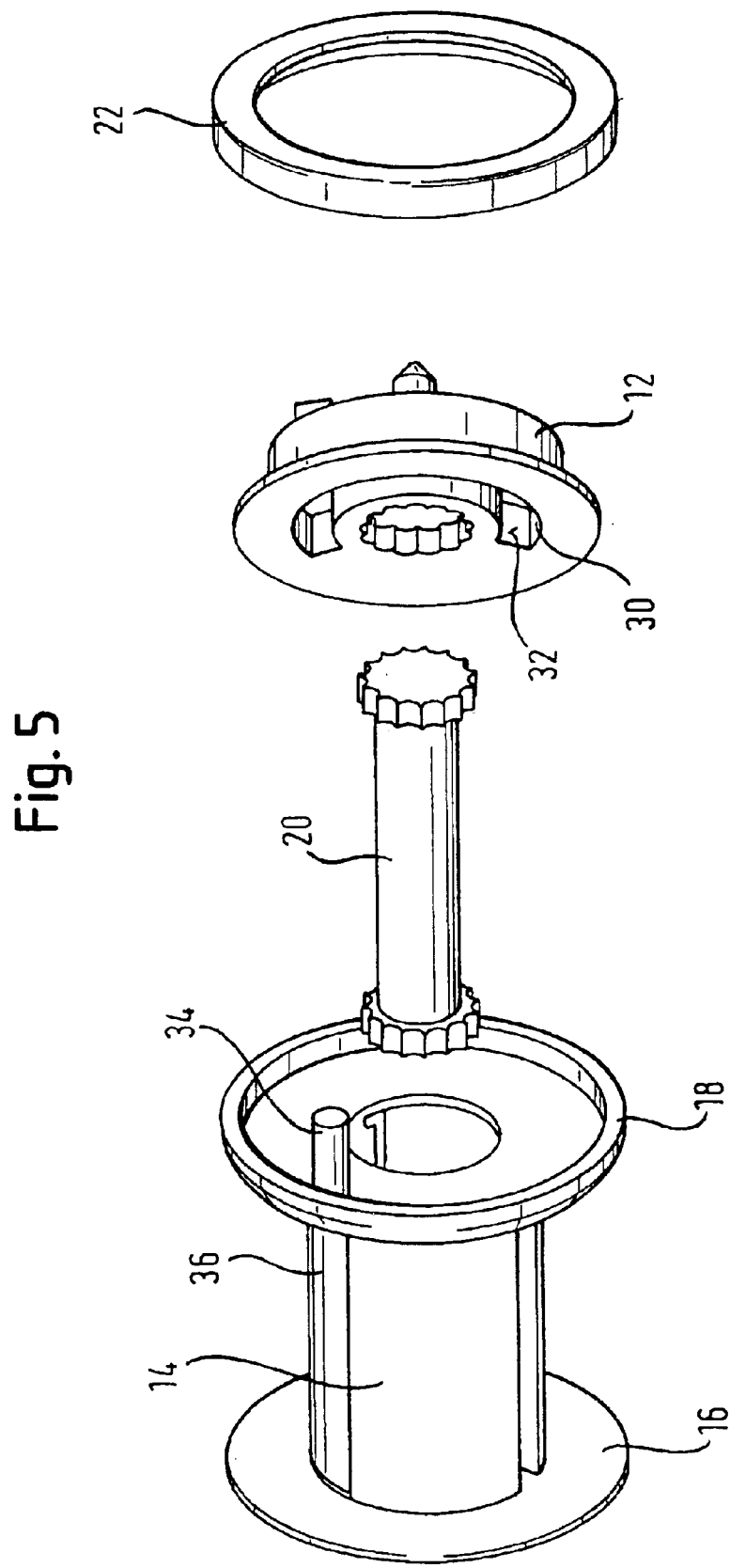

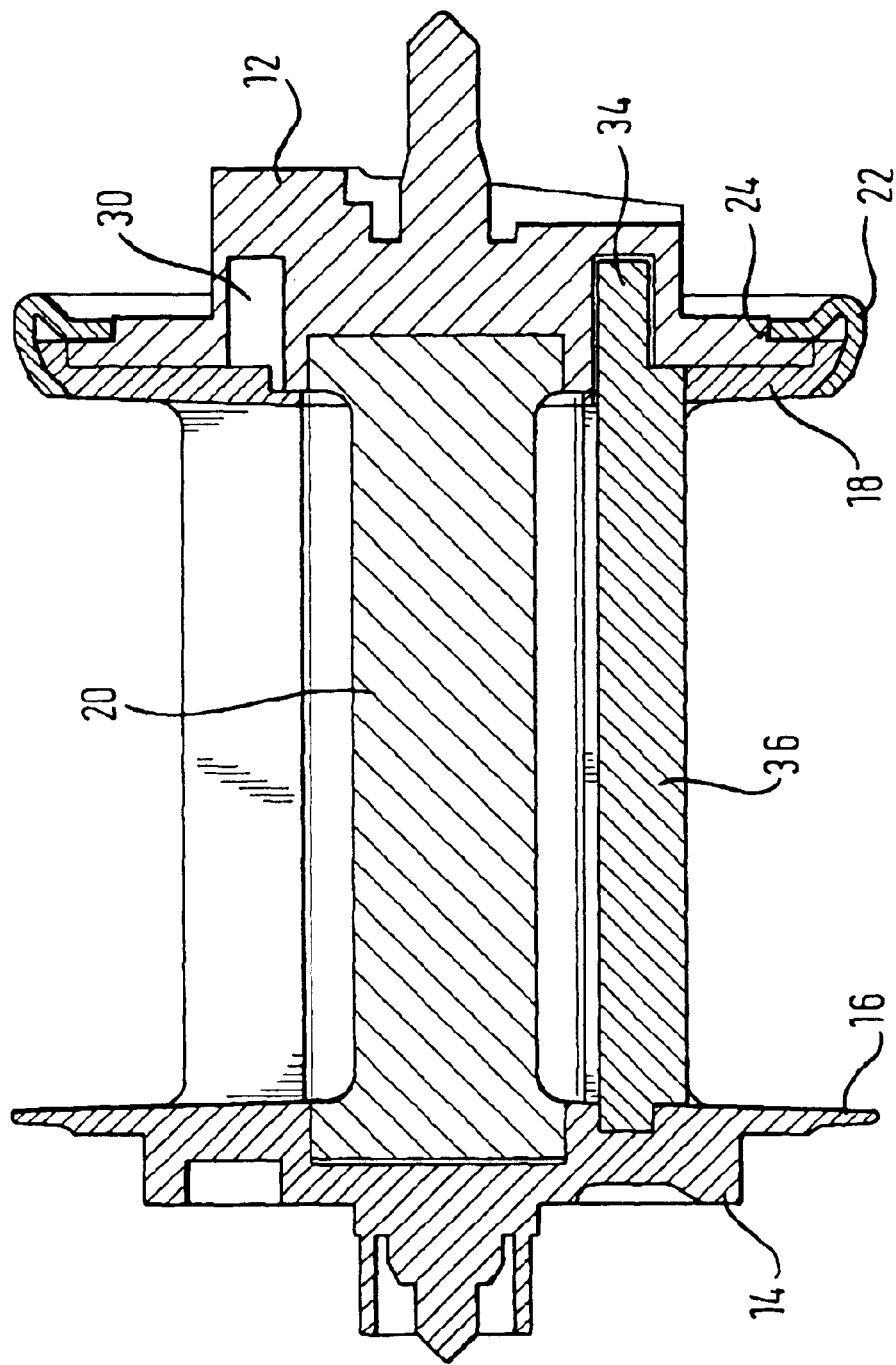

BELT SPOOL FOR A BELT RETRACTOR

TECHNICAL FIELD

The invention relates to a belt spool for a belt retractor.

BACKGROUND OF THE INVENTION

Conventional belt retractor spools comprise a spool body which has at least one flange, a locking disc which is arranged at an axial end of the spool body, and a torsion rod having two ends, one end of which being non-rotatably fastened to the spool body, and the other end of which being non-rotatably fastened to the locking disc.

BACKGROUND OF THE INVENTION

Such a belt spool is known from the DE 200 06 619 U. On the locking disc, a locking catch is arranged which can be guided into teeth, fixed to the housing, of a frame of the belt retractor. In this state, the locking disc is blocked against a rotation relative to the frame of the belt retractor. As the spool body rests against the locking disc via the torsion rod, in this state no belt band can be withdrawn from the belt spool, as long as the torque acting on the spool body is not greater than the torsion resistance moment of the torsion rod. When the torsion resistance moment of the torsion rod is exceeded, a relative rotation occurs between the spool body and the locking disc, which leads to a withdrawal of belt band from the belt spool, which in turn leads to an increased forward displacement of a vehicle occupant who is restrained by the safety belt. This greater forward displacement serves in a known manner to reduce force peaks in the safety belt.

When the torsion resistance moment of the torsion rod is exceeded and the torsion rod is twisted, an increase in length of the torsion rod occurs. In order to prevent the locking disc from becoming detached from the spool body owing to the increase in length, in the known belt spool a shoulder is provided, constructed in one piece with the belt spool, which is flanged over an outer edge of the locking disc. In this way, an axial fastening of the locking disc on the spool body is produced, whilst the locking disc can continue to rotate relative to the spool body.

The object of the invention consists in further developing the belt spool of the type initially mentioned to the effect that the fastening of the locking disc on the spool body is improved.

BRIEF SUMMARY OF THE INVENTION

According to the invention, a belt spool for a belt retractor comprises a spool body which has at least one flange, a locking disc which is arranged at an axial end of the spool body, and a torsion rod having two ends. One of the ends is non-rotatably fastened to said spool body, and the other end is non-rotatably fastened to the locking disc. A holding ring is provided which encompasses the flange and an outer rim of the locking disc, thereby securing the locking disc in axial direction on the spool body. By a separate part being used for fastening the locking disc to the spool body, this can be produced from a material which has improved guiding and bearing characteristics for the locking disc. In particular, provision can be made that the holding ring consists of steel, whereas the locking disc consists of die cast aluminum. The resultant friction pairing has good sliding characteristics, so that a "fretting" with a relative rotation between the locking disc and the spool body is prevented.

Preferably, provision is made that the locking disc has a surrounding shoulder against which the holding ring lies. This improves the bearing characteristics of the holding ring for the locking disc.

According to an embodiment of the invention, provision is made that the locking disc has a partially surrounding channel which ends at a stop face, and that the spool body has a projection which engages into the channel and delimits a rotation of the locking disc relative to the spool body by abutment against the stop face. In this way, with a minimal expenditure, the relative rotation between locking disc and spool body can be limited to a desired extent.

Advantageous developments of the invention will be apparent from the sub-claims.

BRIEF DESCRIPTION OF THE DRAWINGS

FIG. 5 shows in an exploded view a belt spool according to a second embodiment of the invention; and FIG. 6 shows the belt spool according to the second embodiment in a longitudinal section.

DETAILED DESCRIPTION OF THE PREFERRED EMBODIMENTS

Figure 1:
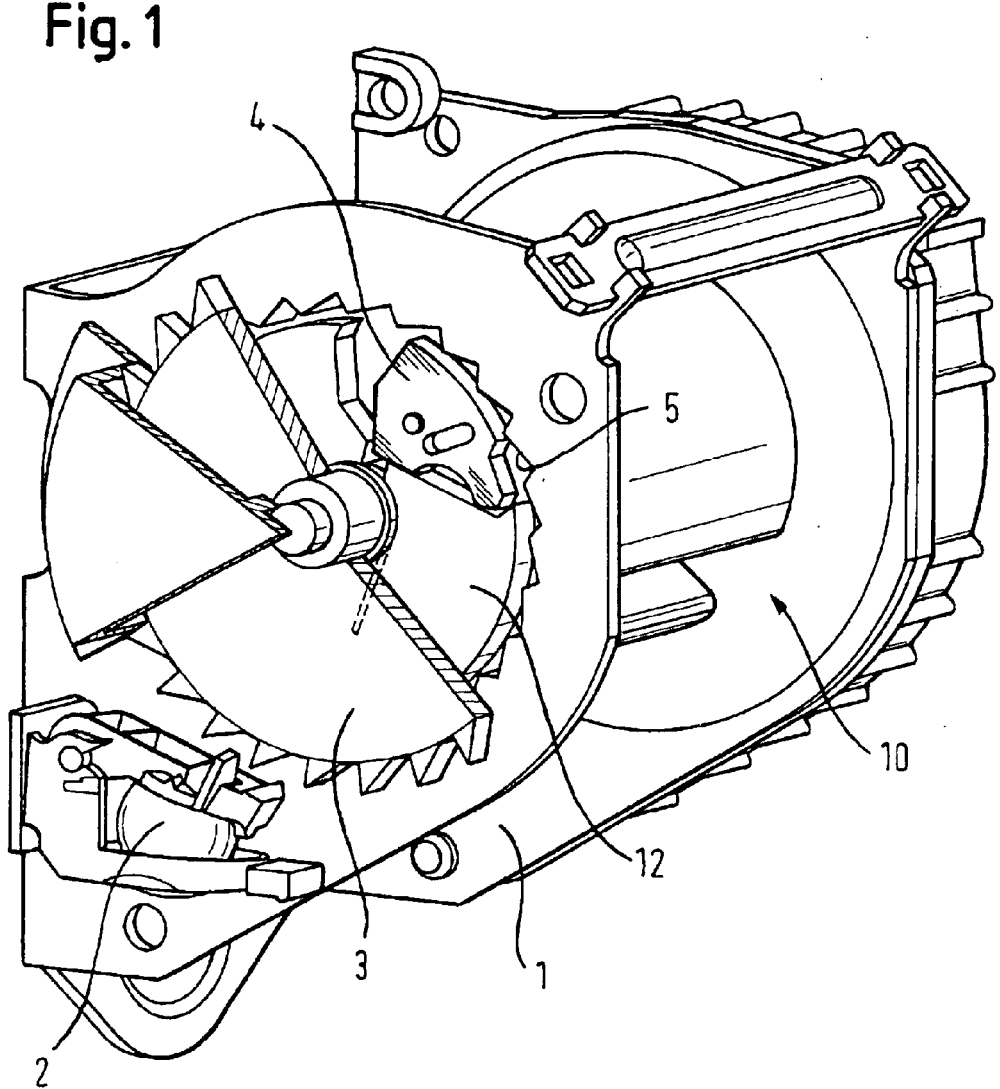
FIG. 1 shows in a perspective view a belt spool incorporated into a belt retractor.
Figure 2:
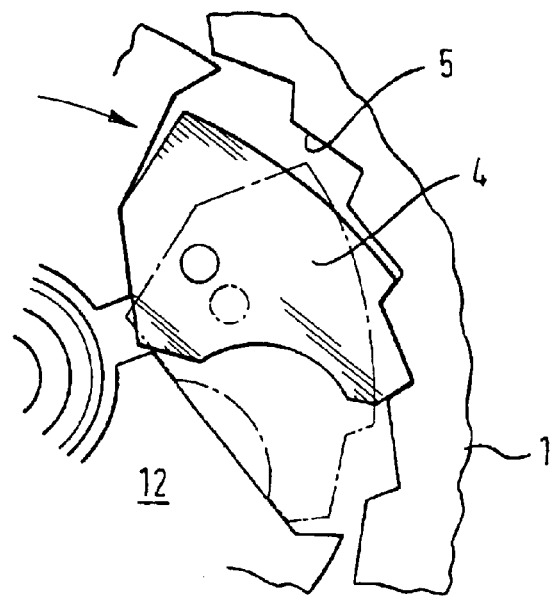
FIG. 2 shows a detail of FIG. 1.
Figure 3:
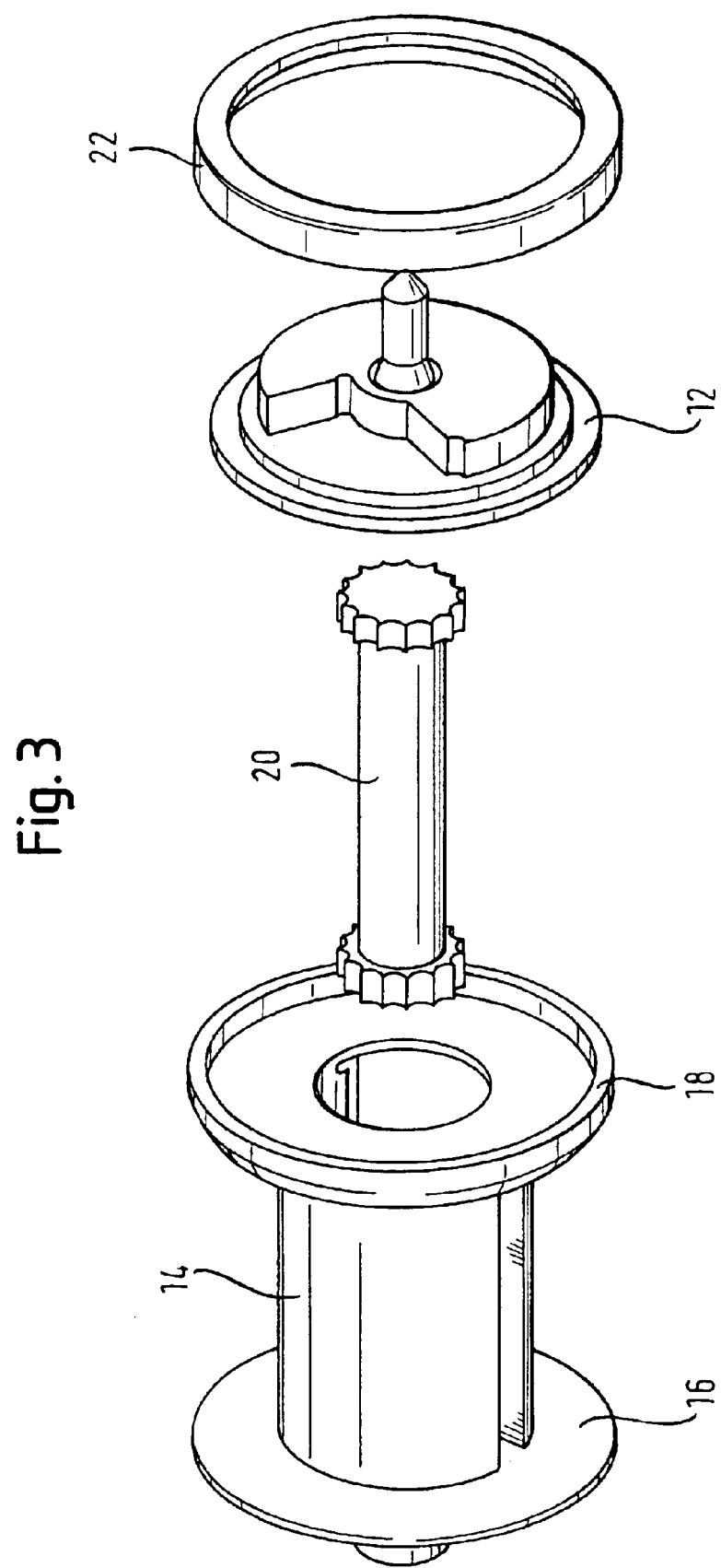
FIG. 3 shows in an exploded view a belt spool according to a first embodiment of the invention.
Figure 4:
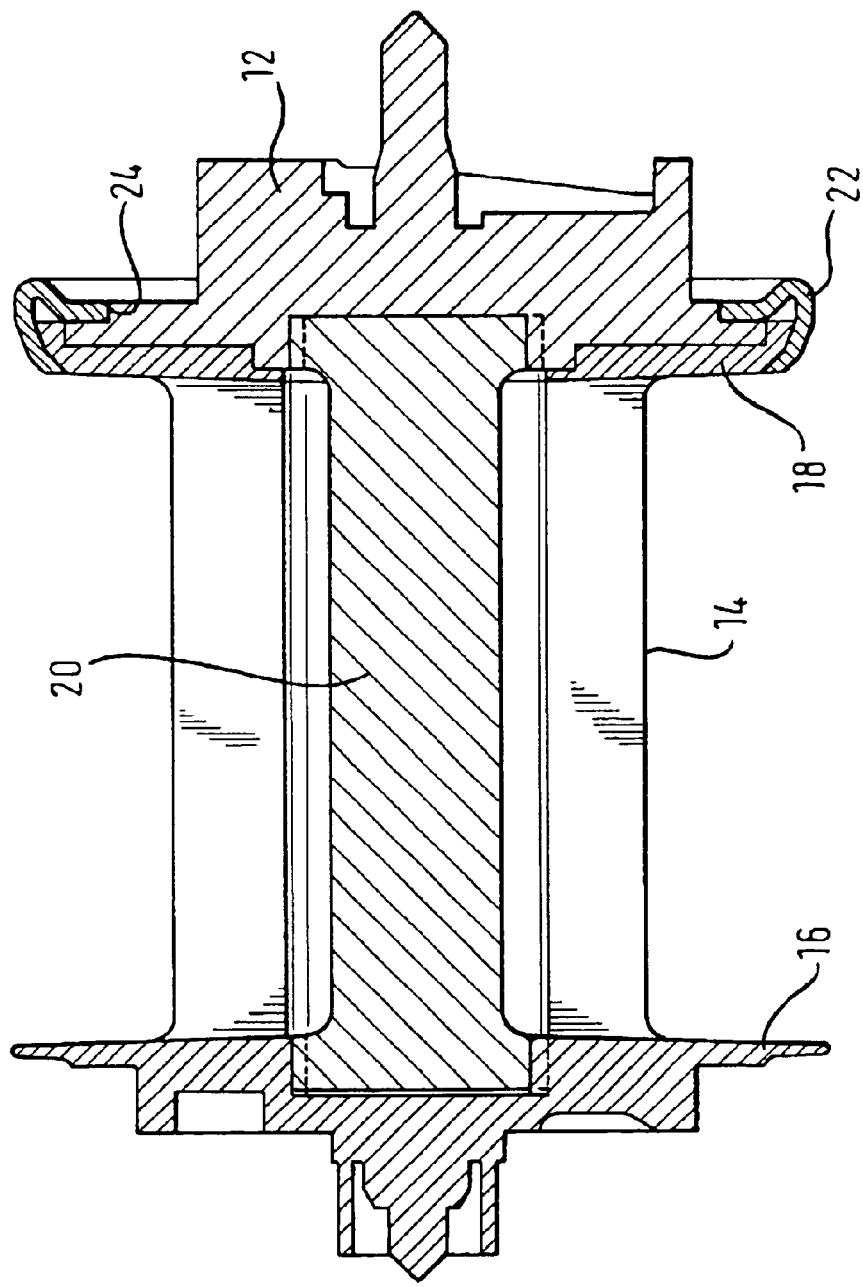
FIG. 4 shows the belt spool according to the first embodiment in a longitudinal section.

In FIG. 1, in a perspective view partially in section, a belt retractor is shown, which contains a belt spool 10 according to the invention. The belt spool is rotatably mounted in a frame 1, on which a sensor 2 is also arranged for the vehicle-sensitive activation of a locking mechanism. The locking mechanism contains a control disc 3 which can perform a rotation relative to the belt spool 10. Coupled with the control disc 3 is a locking catch 4, which is pivotally mounted in a locking disc 12 of the belt spool (see also FIGS. 3 and 4). When the locking catch 4 is swiveled out from its position of rest, shown in FIG. 1, into a locking position shown in FIG. 2, it engages into teeth 5 in the frame 1 of the belt retractor. In this state, the locking disc 12 is non-rotatably supported on the frame 1.

The belt spool 10 (see in particular FIGS. 3 and 4) has a generally cylindrical spool body 14, which is provided with two flanges 16, 18. Between the two flanges 16, 18 a safety belt can be held on the spool body.

Inside the spool body 14, a torsion rod 20 is arranged which at an axial end, here the left-hand end with respect to the figures, is non-rotatably fastened to the spool body. At the opposite axial end, the torsion rod 20 is non-rotatably fastened to the locking disc 12. For fastening, a depression with serrated profile or multi-grooved profile can be used. It is not necessary here to secure the torsion rod in axial direction on the spool body or on the locking disc.

To fasten the spool body, torsion rod and locking disc to each other, a holding ring 22 is provided, which has a generally clip-shaped cross-section and embraces the outer edge both of the flange 18 and also of the locking disc 12. In so doing, it engages on the locking disc 12 on a surrounding, radially aligned shoulder 24. The holding ring 22 consists of steel, so that on the one hand it is sufficiently plastically deformable so that it can be formed from an open state, in which it can be placed over the locking disc 12 and the flange 18, into a closed state. On the other hand, the holding ring 22 has such a strength that the locking disc 12 is held in axial direction securely against the spool body 14.

When sufficiently high tensile forces are in action in the safety belt, with the locking disc 12 blocked, fixed to the frame, the torque acting on the spool body 14 exceeds the torsion resistance moment of the torsion rod 20. Thereby, the torsion rod 20 is twisted, and a relative rotation results between the spool body 14 and the locking disc 12. With this relative rotation, the holding ring 22 acts, through abutment against the shoulder 24 of the locking disc, as a bearing ring for the locking disc 12, so that the locking disc 12 can turn with minimal friction. The torque constructionally predefined by the design of the torsion rod 20, as from which a relative rotation occurs between the spool body 14 and the locking disc 12, is therefore almost not increased through friction. The increase in length of the torsion rod, occurring with the twisting of the torsion rod 20, does not lead to a separation of the locking disc 12 from the spool body 14, because the holding ring 22 can receive any possible axial forces.

In FIGS. 5 and 6 a belt spool is shown according to a second embodiment. The same reference numbers are used for the components known from the first embodiment, and reference is made to the above explanations.

The difference between the first and the second embodiment consists in that in the second embodiment, a channel 30 is provided in the locking disc 12 on its side facing the spool body 14. The channel 30 extends across an angle range of approximately 270 degrees and ends at a stop face 32. In the spool body, a projection 34 is provided which extends as far as into the channel. The projection 34 is constructed here on an insert piece 36, which is fitted into a corresponding recess of the spool body 14.

When, in the second embodiment, a relative rotation occurs between the spool body 14 and the locking disc 12, the channel 30 is moved relative to the projection 34, until the protection comes into abutment against the stop face 32. This delimits the relative rotation between the spool body 14 and the locking disc 12 to a range of rotation of approximately 270 degrees.

What is claimed is:

1. A belt spool (10) for a belt retractor, said belt spool comprising a spool body (14) which has at least one flange (18), a locking disc (12) which is arranged at an axial end of said spool body, and a torsion rod (2) having two ends, one of said ends being non-rotatably fastened to said spool body (14), and said other end being non-rotatably fastened to said locking disc (12), characterized by a holding ring (22) which encompasses said flange (18) and an outer rim of said locking disc (12), thereby securing said locking disc (12) in axial direction on said spool body (14).

2. The belt spool according to claim 1, characterized in that said locking disc (12) has a surrounding shoulder (24) against which said holding ring (22) lies.

3. The belt spool according to claim 1, characterized in that said holding ring (22) consists of steel and said locking disc (12) consists of die cast aluminum.

4. The belt spool according to claim 1, characterized in that said locking disc (12) has a partially surrounding channel (30) which ends at a stop face (32), and that said spool body has a projection (34) which engages into said channel (30) and delimits a rotation of said locking disc relative to said spool body by abutment against said stop face.

* * * * *